Feb 21, 1967 K. T. GRACE ETAL 3,305,845

MAGNETIC MEMORY CORE AND METHOD

Filed Feb. 1, 1963 4 Sheets-Sheet 1

INVENTORS
KENNETH T. GRACE
ROBERT J. TEPLY
BY Herbert F. Sonnemeyer
ATTORNEY

INVENTORS
KENNETH T. GRACE
ROBERT J. TEPLY
BY [signature]
ATTORNEY

INVENTORS
KENNETH T. GRACE
ROBERT J. TEPLY
BY Herbert Blomqvist [signature]
ATTORNEY

MAGNETIC MEMORY CORE AND METHOD

Filed Feb. 1, 1963

INVENTORS
KENNETH T. GRACE
ROBERT J. TEPLY
BY [signature]
ATTORNEY

United States Patent Office 3,305,845
Patented Feb. 21, 1967

3,305,845
MAGNETIC MEMORY CORE AND METHOD
Kenneth T. Grace, Minneapolis, and Robert J. Teply, Hopkins, Minn., assignors to Sperry Rand Corporation, New York, N.Y., a corporation of Delaware
Filed Feb. 1, 1963, Ser. No. 255,627
24 Claims. (Cl. 340—174)

This invention relates in general to memory elements and in particular to a memory element formed by depositing magnetizable material between and along the walls of spaced-apart apertures in a nonmagnetizable base member.

The value of the utilization of small cores of magnetizable material as logical memory elements in electronic data processing systems is well known. This value is based upon the bistable characteristics of magnetizable cores which include the ability to retain or remember magnetic conditions which may be utilized to indicate a binary 1 or 0. As the use of magnetizable cores in electronic data processing equipment increases, a primary means of improving the computational state of these machines is to utilize memory elements that possess the property of nondestructive readout, for by retaining the initial state of remanent magnetization after readout, the rewrite cycle required with destructive readout devices is eliminated. As used herein, the term "nondestructive readout" shall refer to the sensing of the relative direction or state of the remanent magnetization of the magnetizable core without destroying or reversing much remanent magnetization. This should not be interpreted to mean that the state of the remanent magnetization of the core being sensed is not temporarily disturbed during such nondestructive readout.

Ordinary magnetizable cores and circuits utilized in destructive readout devices are now so well known that they need no special description herein. However, for purposes of the present invention it should be understood that such cores are capable of being magnetized to saturation in either of two directions. Furthermore, these cores are formed of a selected magnetizable material having a rectangular hysteresis characteristic which ensures that after the core has been saturated in either direction a definite point of magnetic remanence representing the residual flux density in the core will be retained. The residual flux density representing the point of magnetic remanence in a core possessing such characteristic is preferably of substantially the same magnitude as that of its maximum saturation flux density. These core elements are usually connected in circuits providing one or more input coils for purposes of switching the core from one magnetic state corresponding to a particular direction of saturation, i.e., positive saturation, denoting a binary 1, to the other magnetic state, corresponding to the opposite direction of saturation, i.e., negative saturation, denoting a binary 0. One or more output coils are usually provided to sense when the core switches from one state of saturation to the other. Switching can be achieved by passing a current pulse of sufficient magnitude through the input winding in a manner so as to set up a magnetic field in the area of the core in the sense opposite to the preexisting flux direction, thereby driving the core to saturation in the opposite direction of polarity, i.e., of positive to a negative saturation. When the core switches, the resulting magnetic field variation induces a signal in the other windings in the core such as, for example, the above mentioned output or sense windings. The magnetic material for the core may be of various magnetizable materials such as those known as Mumetal, permalloy, or the ferromagnetic ferrites, such as that known as Ferramic.

Extensive research has been expanded upon developing memory elements which lend themselves to fast, economical fabrication and assembly into three-dimensional memory arrays. Thin ferromagnetic films such as fabricated in accordance with S. M. Rubens Patent No. 2,900,282, and assembled into three-dimensional memory arrays, such as disclosed in S. M. Rubens et al. Patent No. 3,030,612, have achieved high bit densities. V. J. Korkowski in his application Serial No. 206,864, filed July 2, 1962, now Patent No. 3,192,512, and assigned to the assignee of this invention, discloses transfluxor-type memory elements that are formed by the deposition of magnetizable material upon a nonmagnetizable base member.

This invention is a further improvement in the development of high bit-density three-dimensional memory element arrays. It concerns a method of fabricating memory elements by the deposition of magnetizable material in tubular form around a web and along the walls formed by adjacent apertures in a nonmagnetizable base member. As used herein, the term "magnetizable material" shall refer to a material having the characteristic of magnetic remanence, the term being sufficiently broad to encompass material having a substantially rectangular hysteresis loop characteristic. Printed circuit drive lines previously formed to lie along the web pass through or thread the web formed tubular magnetizable material providing close coupling between drive lines and the memory element. Interrogate lines thread the apertures to provide nondestructive readout of the information stored in the web formed tubular memory element.

Accordingly, it is a primary object of this invention to provide a method of fabricating a novel memory element.

Another object of this invention is to provide a memory element formed by deposition of magnetizable material in tubular form around a web and along the walls formed by adjacent apertures in a nonmagnetizable base member.

Another object of this invention is to provide a method of fabricating by deposition a closed flux path magnetizable memory element having printed circuit conductive lines threaded therethrough.

A further and more general object of this invention is to provide a novel memory element and a method of fabricating same.

These and other more detailed and specific objectives will be disclosed in the course of the following specification, reference being had to the accompanying drawings, in which.

Figure 1:
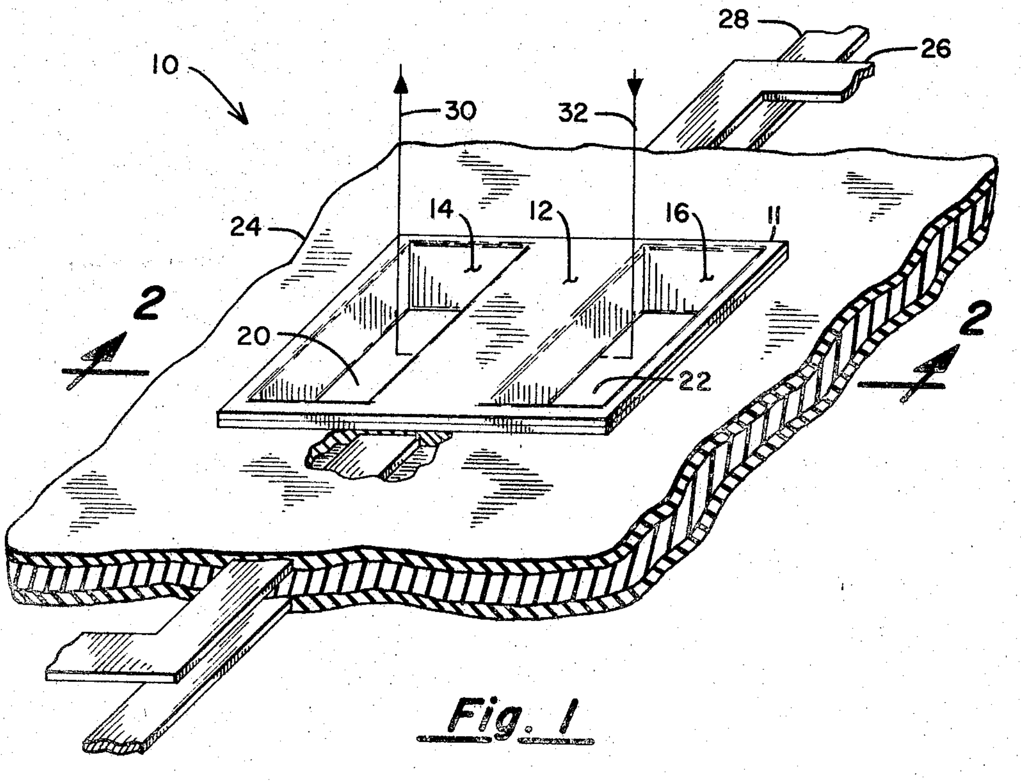
FIG. 1 is a trimetric view of a preferred embodiment of a memory element proposed by the present invention.

Referring now to the drawings wherein like reference numbers designate similar components, and more particularly to FIG. 1, there is illustrated a preferred embodiment of a memory element proposed by the present invention. Memory element 10 is formed of magnetizable material 11 to have three closed flux paths 12, 14 and 16. Path 12 is formed by depositing magnetizable material 11 around web 18 (see FIG. 2) and paths 14 and 16 are formed by depositing magnetizable material 11 along the walls formed by apertures 20 and 22 in substrate 24 which preferably is of a nonconductive, i.e., insulative, and nonmagnetizable material. Printed circuit sense-digit line 26 and printed circuit word line 28 are formed on opposing surfaces of substrate 24 threading path 12, thus affording intimate magnetic coupling therebetween. Interrogate lines 30 and 32 thread apertures 20 and 22, respectively, and consequently, paths 14 and 16, which are formed along the walls thereof.

Flux path 12 possesses the magnetic characteristic of shape anisotropy having a preferred, or easy, axis along which the path's remanent magnetization lies. This easy axis is in the circumferential direction following the closed flux path of flux path 12 while the hard axis lies orthogonal thereto. However, it is additionally preferred that flux path 12 possesses the magnetic characteristic of magnetic field anisotropy having an axis that is coincident with the axis of the shape anisotropy. This combination of shape and magnetic field anisotropy provides a flux path 12 having optimum magnetic characteristics providing a maximum signal-to-noise ratio and maximum resistance to high intensity readout flux induced in flux paths 14 and 16.

Figure 2:
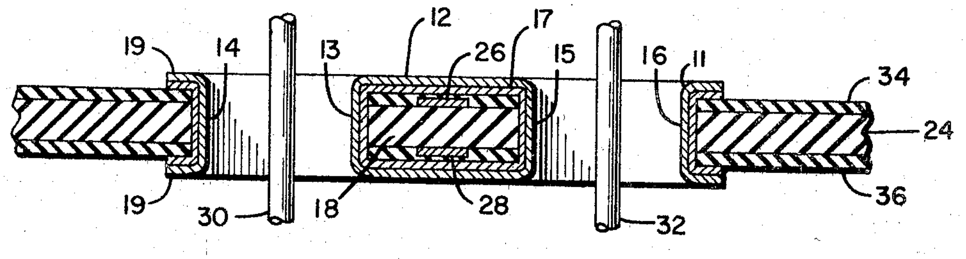
FIG. 2 is an illustration of a cross-sectional view of the memory element of FIG. 1 showing the stacked relationship of the components thereof.

Referring now to FIG. 2, there is illustrated a cross-sectional view of memory element 10 presenting a diagrammatic illustration of the stacked relationship of the components of FIG. 1. In a typical embodiment substrate 24 may be a 0.0025 inch thick sheet of polyethylene terephthalate with printed circuit lines 26 and 28 being 0.0002 inch thick layers of copper insulated from path 12 by insulative layers 34 and 36, respectively. Insulative layers 34 and 36 may be of an epoxy resin applied by brushing, spraying or dipping. Flux paths 12, 14 and 16 may be of a magnetizable material 11 which is deposited upon the appropriate surfaces of conductive layer 17 by an electroplating process. The thickness of the magnetizable material 11 of flux paths 12, 14 and 16 may be of any desired thickness as determined by the fabricating techniques used and the desired operating mode of the memory element 10. In the illustrated embodiment this thickness is in the range of 10,000 to 20,000 Angstroms. In view of the above remarks, it is to be understood that the illustration of FIG. 2 is not intended to represent actual or comparative dimensions or sizes but is presented to better understand the illustrated embodiment of FIG. 1.

Operation of memory element 10 in the readout mode involves the temporary "flux rotation" of magnetic flux in portions of path 12 common to path 14 and to path 16. FIG. 2 illustrates those portions as portion 13 which is common to paths 12 and 14, and portion 15 which is common to paths 12 and 16. It can be seen that a magnetic field generated by drive signals flowing through sense-digit line 26 or word line 28 is in a clockwise or counterclockwise direction about web 18 as determined by the polarity of the drive signal. Thus, such drive signals set the flux in path 12 in a corresponding clockwise or counterclockwise direction. Additionally, it can be seen that the magnetic field generated by an interrogate signal flowing through interrogate lines 30 and 32 is in a clockwise or counterclockwise direction in paths 14 and 16. respectively. In portion 13, which is common to the paths 12 and 14, and portion 15 which is common to paths 12 and 16, there are two orthogonal flux paths the respective relationships of the flux directions being a function of the flux of path 12 which is indicative of the binary information stored therein, and the flux in paths 14 and 16 which in the preferred embodiment of the present invention is generated by a unipolar signal. The flux of path 12 is only temporarily affected by a temporary flux rotation of the flux in portions 13 and 15 due to the action of a temporary interrogate flux induced in paths 14 and 16 by an interrogate pulse flowing through interrogate lines 30 and 32, respectively. This temporary affect to the flux of path 12 is believed to be similar to the non-destructive readout system disclosed by the article "Non-destructive Sensing of Magnetic Cores," Transactions of the AIEE, Communications on Electronics, Buck and Frank, January 1954, pp. 822–830. The temporary alteration of the flux in path 12 generates a bipolar readout signal in sense-digit line 26 the polarity phase of which is indicative of the clockwise or counterclockwise direction of flux in path 12. As the direction of the flux in path 12 is a function of the binary data stored therein it can be seen that nondestructive readout of the information stored in path 12 is accomplished by the disclosed preferred embodiment of FIG. 1.

In an additional embodiment, memory element 10 may be composed of a thin film of magnetizable material having single domain properties and exhibiting a substantially rectangular hysteresis loop characteristic. As regards this application, the term "single domain properties" may be considered the characteristic of a three-dimensional element of magnetizable material having a thin dimension which is substantially less than the width and length thereof wherein no domain walls can exist parallel to the large surface of the element. In this embodiment, it would be preferred that in addition to flux path 12 having the hereinbefore discussed shape and magnetic field anisotropy, flux paths 14 and 16—except portions 13 and 15—have a magnetic field anisotropy having an axis that is across the paths' long dimension, i.e., perpendicular to the major surfaces of substrate 24. In this embodiment the flux in portions 13 and 15 would rotate in a single domain rotational mode with the anisotropy fields of flux paths 12, 14 and 16 effecting a faster flux variation in portions 13 and 15 causing a larger amplitude readout signal to be induced in sense-digit line 26.

Figure 3:
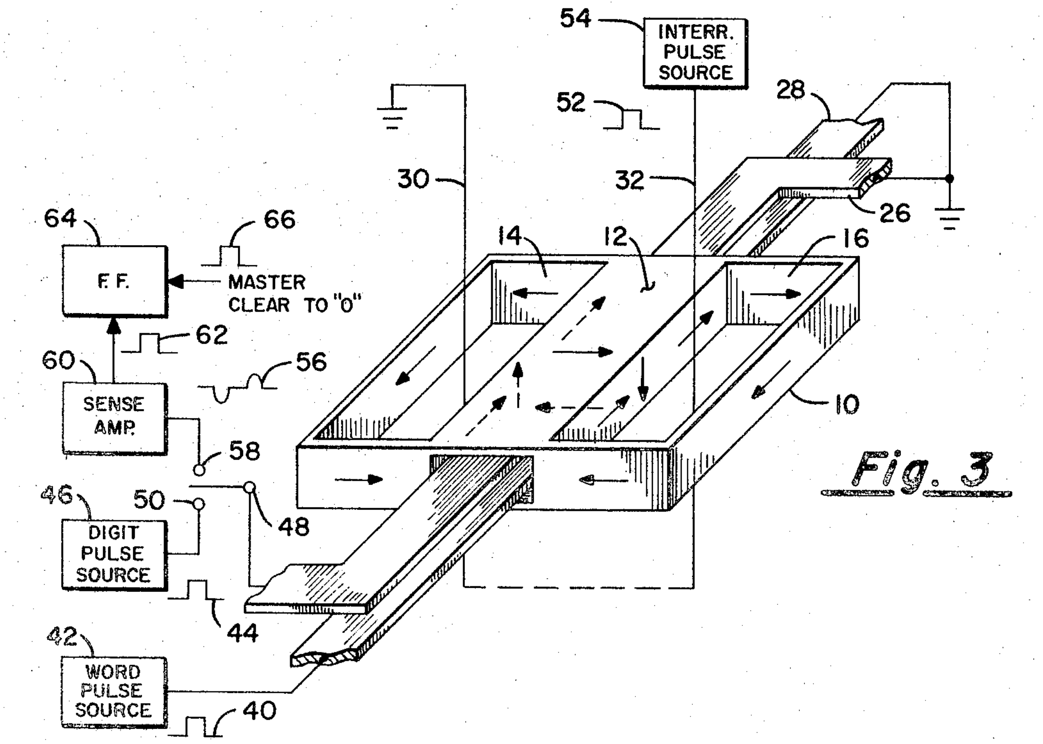
FIG. 3 is a trimetric view of the element of FIG. 1 illustrating the magnetic flux paths and signal relationships for the writing and reading of a binary 1.

Referring to FIG. 3, there is disclosed a trimetric view of the memory element 10 of FIG. 1 illustrating the magnetic flux paths and signal relationships for the writing and reading of a binary 1. Writing information into path 12 is accomplished by passing coincident signals of suitable polarity down sense-digit line 26 and word line 28 while reading the information out of path 12 is accomplished by passing a unipolar signal down interrogate line 32, coupling path 16, and up interrogate line 30, coupling path 14.

Writing a 1 into memory element 10 is acomplished by the coupling of word pulse 40 from word pulse source 42 to word line 28 coincident with the coupling of digit pulse 44 from digit pulse source 46, with switch means 48 in position 50, to sense-digit line 26. Pulses 40 and 42 combine by well-known coincident-current writing techniques to set the flux in path 12 into a clockwise direction. Readout of the information stored in path 12 is then accomplished by the coupling of interrogate pulse 52 from interrogate pulse source 54 to intercoupled interrogate lines 32 and 30. A resulting readout 1 signal 56 is generated in sense-digit line 26, with switch means 48 in position 58, which is coupled to sense amplifier 60. Sense amplifier 60, which is responsive only to a positive phase polarity 1 signal 56, couples a set pulse 62 to flip-flop 64, which, having been previously cleared to a 0 by master clear pulse 66, is set to 1.

Figure 4:
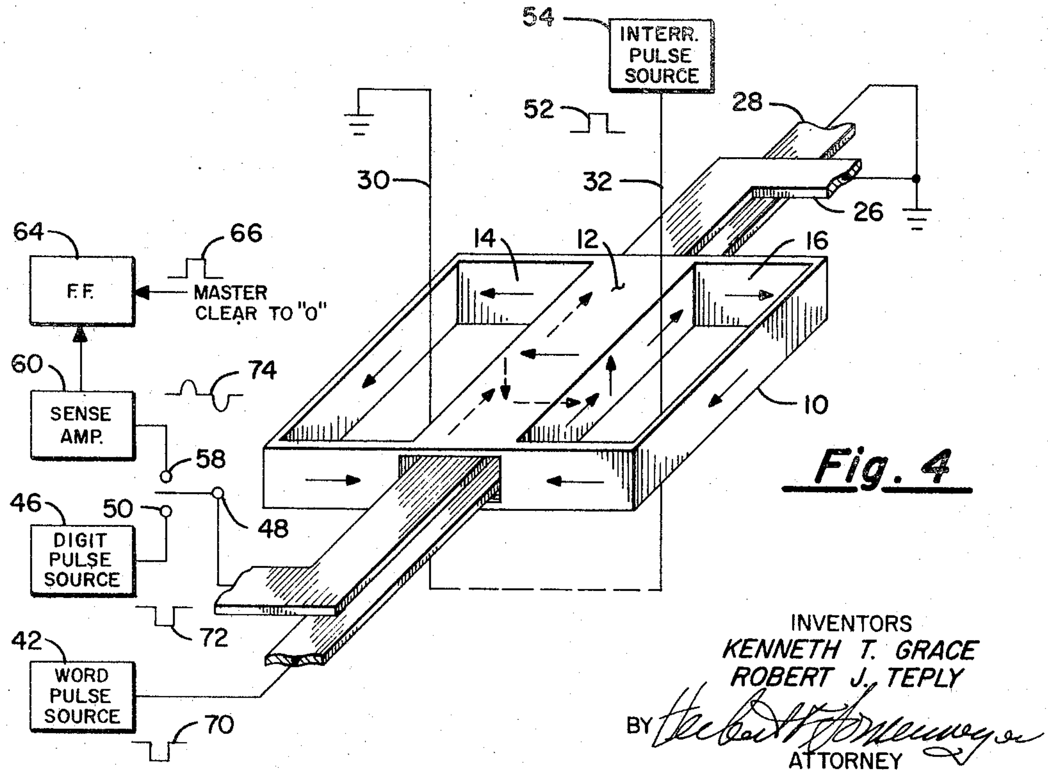
FIG. 4 is a trimetric view of the element of FIG. 1 illustrating the magnetic flux paths and signal relationships for the writing and reading of binary 0.

Referring to FIG. 4, there is illustrated a trimetric view of memory element 10 of FIG. 1 illustrating the magnetic flux paths and signal relationships for the writing and reading of a binary 0. Writing of a 0 into memory element 10 is accomplished by the coupling of word pulse 70 from word pulse source 42 to word line 28 coincident with the coupling of digit pulse 72 from digit pulse source 46, with switch means 48 in position 50, to sense-digit line 26. Pulses 70 and 72 combine by well-known coincident-current writing techniques to set the flux in path 12 into a counterclockwise direction. Readout of the information stored in path 12 is then accomplished by the coupling of interrogate pulse 52 from interrogate pulse source 54 to inter-coupled interrogate lines 32 and 30. A resulting readout 0 signal 74 is generated in sense-digit line 26, with switch means 48 in position 58, which is coupled to sense amplifiers 60. Sense amplifier 60 which is responsive only to positive phase polarity 1 signal 46, does not couple a set pulse 62 to flip-flop 64 which, having been previously cleared to 0 by master clear pulse 66, remains in the cleared 0 state.

Figure 5:
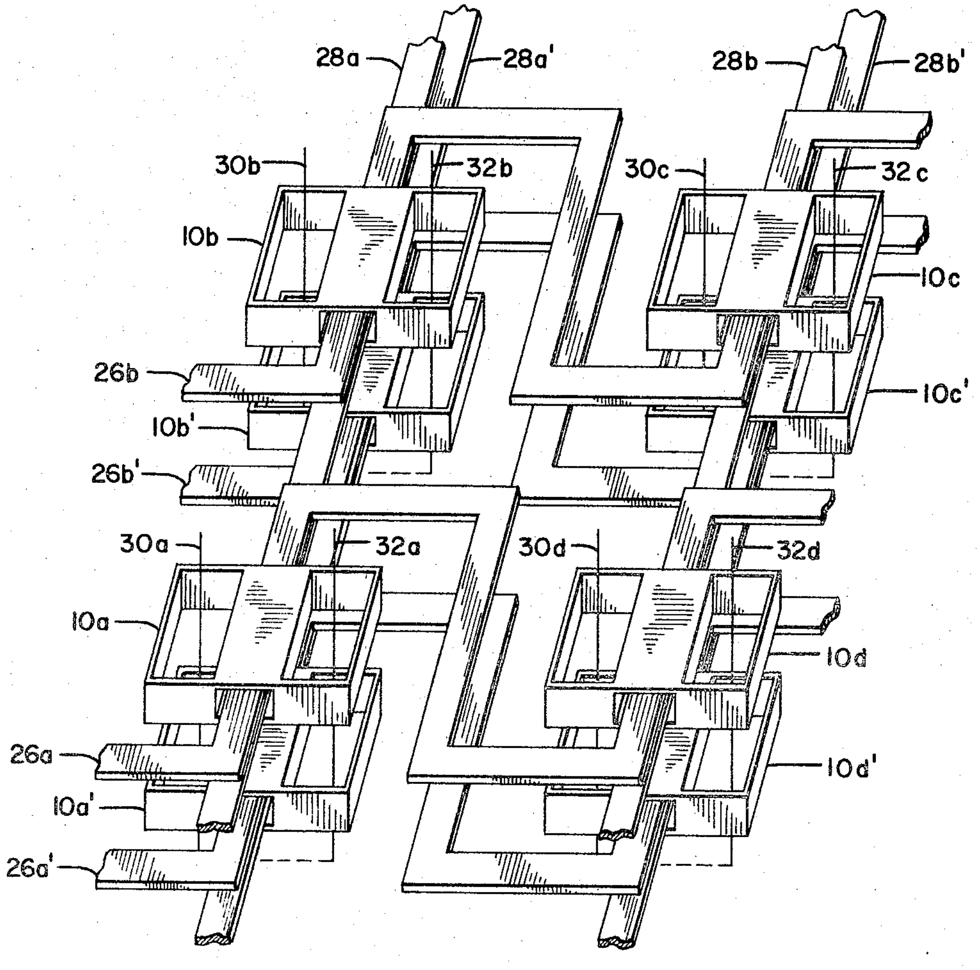
FIG. 5 is a trimetric view of a plurality of elements of FIG. 1 arranged in a matrix array permitting coincident-current writing and word-organized reading of four two-bit words.

Referring to FIG. 5, there is illustrated a trimetric view of a plurality of memory elements 10 arranged in a matrix array permitting coincident-current writing and word-organized reading of four two-bit words. In the arrangement of FIG. 5 memory elements 10*a*, 10*b*, 10*c* and 10*d* lie in a top first-plane and memory elements 10*a'*, 10*b'*, 10*c'* and 10*d'* lie in a bottom second-plane with words lying in the vertical direction, as, for example, defined by memory elements 10*a* and 10*a'*. Thus, by the proper selection of sense-digit line 26, word line 28, pairs of each of the first and second planes and the coupling of the proper polarity write 1 pulses 44 and 40, or write 0 pulses 72 and 70, a 1 or a 0 may be written into any one of the memory elements 10 of the first or second planes. Further, by the coupling of interrogate pulse 52 to any one of interrogate lines 32*a*, 32*b*, 32*c*, or 32*d* the information stored in the memory elements 10 coupled to the respective interrogate lines 32*a*, 32*b*, 32*c*, and 32*d* is read out on the respective sense-digit lines 26*a* and 26*a'*, or 26*b* and 26*b'*.

Figure 6:
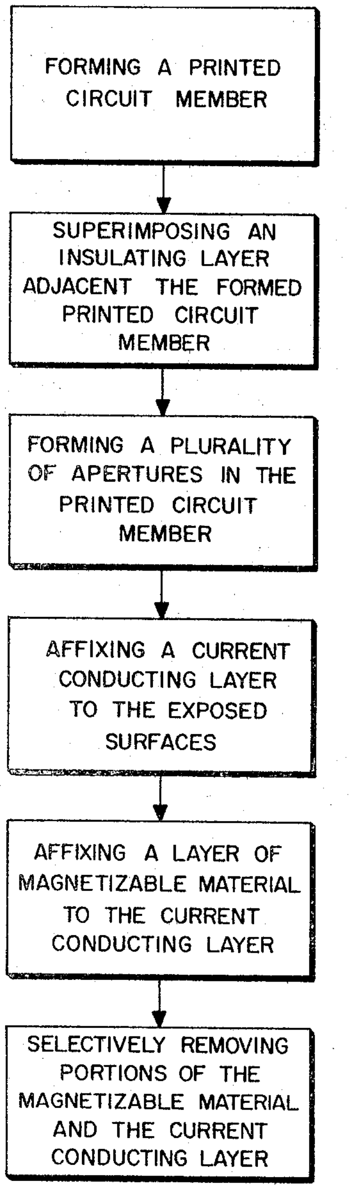
FIG. 6 is a flow diagram illustrating a typical series of steps which may be followed in preparing a memory element in accordance with the preferred technique of the present invention.
Figure 7:
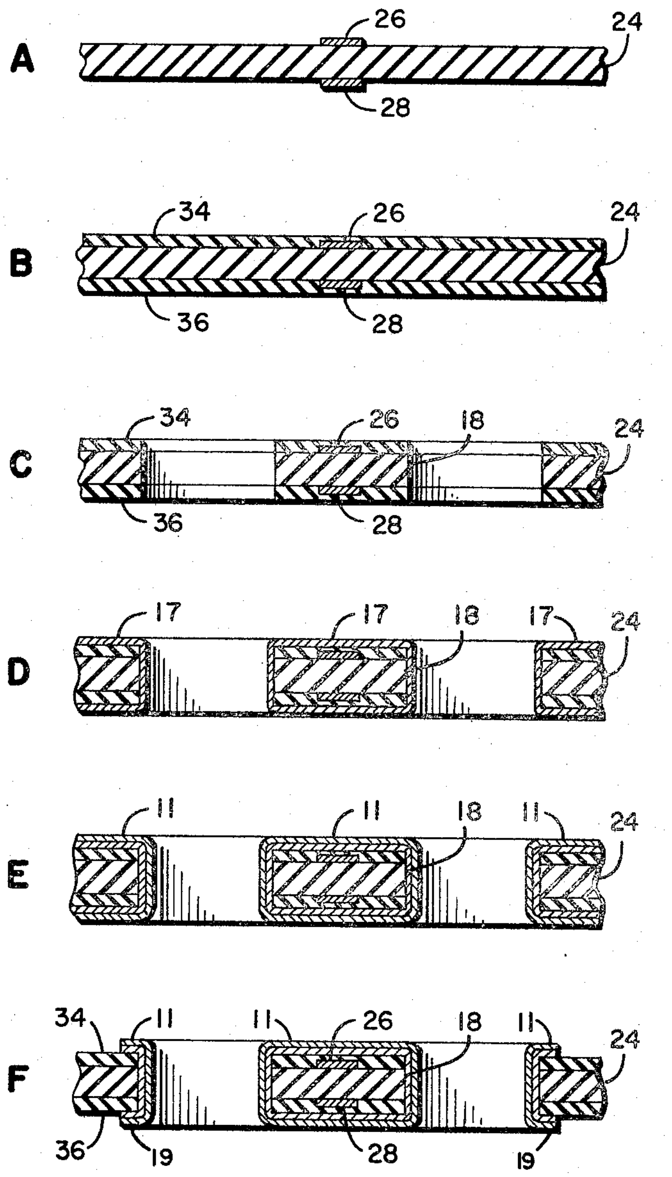
FIG. 7 is a series of views illustrating a typical production element which is under preparation in accordance with the technique of FIG. 6, the various figures illustrating the element progressively in various stages of its production and corresponding to the steps which are indicated adjacently in the flow diagram of FIG. 6.

Discussion of an exemplary method of fabrication of the memory element proposed by this invention shall proceed with reference to FIGS. 6 and 7. FIG. 6 illustrates a flow diagram of a series of steps which may be followed in preparing a memory element in accordance with a preferred technique of this invention. FIG. 7 illustrates progressively the appearance of the product of this invention during various stages of its fabrication. Each of the illustrations of FIG. 7 are located adjacent the step during which it is formed as seen in the flow chart of FIG. 6.

As is indicated by the flow chart of FIG. 6, a preferred method of practicing the present invention commences with the forming or fabrication of a printed circuit member as in step A. The printed circuit member may be formed in accordance with methods well known in the printed circuit art today. For example, a sheet of electrically insulating material, having copper foil affixed to the opposite major surfaces thereof, may be exposed to the action of a suitable etchant for selectively removing portions of the copper foil, those portions of copper foil remaining after etching forming the printed circuit conductors and such other elements as may be desired. In the preferred embodiment, the insulating material is a sheet of polyethylene terephthalate having a dimension as discussed hereinfore. Other materials, such as epoxy or phenolic resins, may also be used to form the insulating member.

After forming a printed circuit member that exhibits the desired conductor pattern, step B of the present invention is initiated. During this step a layer of insulation is formed over the conductor-bearing surfaces of the printed circuit member such that the conductors are sandwiched between insulating layers for a purpose to become clear hereinafter. The insulating layers 34 and 36 are preferably formed from a suitable material which is in a liquid or semi-liquid state at room temperature and becomes solidified at either room or elevated temperatures and which, when solidified, is an electrical insulator. The insulating material, which in the preferred embodiment is an epoxy resin, may be applied by brushing, spraying, or dipping. In an alternative method a sheet or film of insulating material, such as polyethylene terephthalate, may be adhesively affixed to the conductor-bearing surfaces of the printed circuit member.

After the applied insulating layer has been cured or otherwise caused to harden, the next step C of the present invention is performed. During this step a predetermined pattern of rectangularly shaped apertures 20 and 22 is formed in the insulatively coated printed circuit member, these apertures being formed simultaneously by punching. When circular apertures are employed they may be formed by other techniques, such as drilling.

The next step D of the present invention is a metalizing step performed to form an electrically conductive layer 17 on the insulating layers 34 and 36 and on the walls of apertures 20 and 22. The metalizing step may be accomplished in accordance with well-known methods in the electroplating art for metalizing insulating or electrically nonconductive material. For example, after pre-treating the insulating layers 34 and 36 such that the surfaces thereof are adapted to receive a metallic coating, an electrically conductive material 17, such as copper or nickel-phosphorus may be electrolessly or chemically deposited on these surfaces and the aperture walls. In the preferred embodiment after proper pre-treatment, substrate 24 is coated with a nickel-phosphorus alloy deposited electrolessly from a bath of the following composition:

TABLE

| | |
|---|---|
| $NiSO_4.6H_2O$ (nickel sulphate) | 35±3.5 gr./ltr. |
| $Na_3C_6H_5O_7.2H_2O$ (sodium citrate) | 11.5±1.2 gr./ltr. |
| $NaC_2H_3O_2.3H_2O$ (sodium acetate) | 35±3.5 gr./ltr. |
| $NaH_2PO_2.H_2O$ (sodium hypophosphite) | 35±3.5 gr./ltr. |
| $MgSO_4.7H_2O$ (magnesium sulphate) | 41±4.1 gr./ltr. |
| pH | 4.0±0.5. |
| Temperature | 180±20° F. |

Time—Sufficient to obtain a uniform electrically conductive coating (approximately 2½ min.).

The electrolessly formed metallic coating should exhibit a thickness and degree of continuity adequate to produce suitable conductivity for an electroplating step, which is the next step of the present invention.

In accordance with step E, the metallically coated printed circuit member is immersed in an electroplating solution appropriate for depositing a magnetizable material 11, the metallic coating 17 serving as the cathode on to which the magnetizable material 11 is applied in the usual manner. In the preferred embodiment of the present invention the magnetizable material 11 is an alloy having a composition of about 83% nickel and 17% iron. Such a material may be electrodeposited from a solution having an initial composition as follows:

TABLE

| | |
|---|---|
| $NiSO_4.6H_2O$ | 180±10 gr./ltr. |
| $FeSO_4.7H_2O$ | 8±0.5 gr./ltr. |
| Saccharin | 0.8±0.05 gr./ltr. |
| Temperature | 40±5° C. |
| Current density | 5±0.5 milliamperes per cm.². |

Time—Sufficient time to yield a deposit of 10,000–20,000 Angstrom units thickness.

This solution is periodically analyzed and replenished to maintain the deposition of a magnetizable material having a composition of about 83% nickel and 17% iron.

The next step F in the operation consists in selectively removing the magnetizable material 11 and the underlying copper layer 17 which has been formed in areas other than on the aperture walls and the web 18 therebetween. Removal of the undesired magnetizable material and the copper layer upon which it has been deposited is believed best accomplished by etching. In accordance with step F of the present invention this is accomplished by coating the plated surfaces of the printed circuit member with an etchant resist, preferably of the photosensitive type such as is employed in the fabrication of printed circuits. The electroplated member may be coated with the resist material by immersion in a solution thereof, and, after drying, the resist is selectively exposed to a light source through a suitable negative. The negative is opaque except for a pattern of rectangularly shaped areas which permit the passage of light, which pattern is registered with respect to the printed circuit such that the rectangular areas formed on the printed circuit member by the pairs of apertures and the web therebetween, are covered by the light transparent portions of the negative. Therefore, upon exposure to light the negative permits only the resist material deposited on the aperture walls and the web therebetween to harden. It is not a requisite that the negative be perfectly aligned with the apertures such that only the walls thereof are exposed to light. Rather it is preferred that the transparent portions of the negative be large enough to permit exposure of the surface material about the rim of each aperture in order that this area also may be protected from an etchant. Upon developing the unexposed resist is removed and thereafter the plated member is exposed to the action of a suitable etchant, such as a solution of ferric chloride, for removing the undesired metallic material. After the etching has been completed and the cards properly cleaned, the hardened resist present on the aperture walls and the web may be removed by exposure to a suitable solvent. The overhang or ring 19 (seen best in FIG. 2), although not a requisite, is believed desirable for strengthening the bond between the circuit card and the metallic portions deposited on the aperture walls. In an alternative method an etchant resist may be applied by brushing, care being taken to coat only the magnetizable material deposited on the aperture walls and the web therebetween.

In an alternate method, step F of FIG. 6 may be dispensed with providing a finished product as illustrated in FIG. 7, detail E. This product—as regards the magnetizable material 11—is essentially two parallel sheets of magnetizable material 11 separated by substrate 24 and intercoupled by a plurality of tubes formed by magnetizable material 11 deposited upon the walls of apertures in substrate 24. This embodiment may be utilized when the more favorable operating characteristics of the product of FIG. 7 detail F are not required. The more favorable operating characteristics of the product of FIG. 7 detail F as compared to those of the product of FIG. 7 detail E include:

(a) Negligible flux coupling between memory elements 10;

(b) Minimum drive and readout signal inductive and capacitive loading;

(c) Minimum distortion of drive and readout signal.

It is understood that suitable modifications may be made in the structure and method as disclosed provided such modifications come within the spirit and scope of the appended claims. Having now, therefore, fully illustrated and described our invention, what we claim to be new and desire to protect by Letters Patent is:

What is claimed is:

1. A memory element comprising:
a nonmagnetizable base member having at least first and second spaced-apart apertures therethrough forming a web therebetween,
a magnetizable material affixed to the walls of said apertures and to said web forming flux paths around said aperture walls and said web,
a printed circuit conductor disposed upon said web threading said web formed flux path, and
insulating material electrically insulating said printed circuit conductor from said web formed flux path.

2. A memory element comprising:
a nonmagnetizable base member having at least first and second spaced-apart apertures therethrough forming a web therebetween;
a magnetizable material affixed to the walls of said apertures and to said web forming flux paths around said aperture walls and said web, and
first and second printed circuit conductors threading the flux path formed by the magnetizable material affixed to said web.

3. A two-dimensional memory array comprising:
a plurality of memory elements defined by claim 2 arranged in an array of rows and columns with a separate one of said memory elements at each row-column intersection,
the said first conductor of each memory element of each row intercoupled, and
the said second conductor of each memory element of each column intercoupled.

4. A three-dimensional memory array comprising:
a plurality of similar two-dimensional arrays defined by claim 3 wherein similarly located memory elements of each two-dimensional array are grouped in a stacked, superposed relationship, and separate intercoupled pairs of first and second interrogate conductors thread said first and second apertures, respectively, of all memory elements of each group of stacked, superposed memory elements.

5. The apparatus of claim 4 further comprising:
digit drive means selectively coupled to said intercoupled first conductors,
sense amplifier means selectively coupled to said intercoupled first conductors,
word drive means selectively coupled to said intercoupled second conductors, and
interrogate drive means selectively coupled to said intercoupled pairs of first and second interrogate conductors.

6. The apparatus of claim 5 wherein information is stored in each of said memory elements by placing the flux in the magnetizable material affixed to said web in a first or a second and opposite circumferential remanent magnetic state and wherein
information is randomly stored in any one memory element by the selective coincident coupling of said digit drive source to a first conductor and said word drive source to a second conductor both conductors coupling said one memory element, and
information is randomly read out of any one memory element by the selective coincident coupling of said sense amplifier means to the first conductor and said interrogate drive means to the intercoupled pairs of first and second interrogate conductors, all three conductors coupling said one memory element.

7. A memory element comprising:
a nonmagnetizable base member having at least first and second spaced-apart apertures therethrough forming a web therebetween;
a magnetizable material affixed to the walls of said first and second apertures and to said web forming first and second low remanent magnetization flux paths around said first and second aperture walls, respectively, and a third high remanent magnetization flux path around said web;
first and second conductors threading the said third flux path;
intercoupled third and fourth conductors threading the said first and second flux paths, respectively;
information stored in said third flux path in a first circumferential remanent magnetic state or a second circumferential remanent magnetic state opposite to said first state.

8. A memory element comprising:
a nonmagnetizable base member having at least first and second spaced-apart apertures therethrough forming a web therebetween;
a magnetizable material affixed to the walls of said first aperture and to said web forming a first low remanent-magnetization flux path around said first aperture walls and a second high remanent-magnetization flux path around said web;
a first conductor threading said first flux path;
a second conductor threading said second flux path;
information stored in said second flux path in a first circumferential remanent magnetic state or a second circumferential remanent magnetic state opposite to said first state.

9. A memory element comprising:
a nonmagnetizable base member having at least first and second apertures therethrough forming a web therebetween;
a memory element of magnetizable material affixed to the walls of said apertures and the web therebetween and defined thereby;
a first closed flux path defined by the magnetizable material affixed to said web;
a second flux path defined by the magnetizable material affixed to the walls of said first aperture;
a third flux path defined by the magnetizable material affixed to the walls of said second aperture;
said first and second flux paths having a first common portion;
said first and third flux paths having a second common portion;
first and second printed circuit conductors disposed upon said web threading said first flux path;
third and fourth intercoupled conductors threading said second and third flux paths;
interrogate means;
sense means;
information stored in said first flux path in a first or second and opposite circumferential remanent magnetic state;
information read out of said first flux path by said sense means by the coupling of said interrogate means to said intercoupled third and fourth conductors causing a temporary flux to be induced in said second and third flux paths effecting a temporary reduction of the flux in said first flux path due to the interaction of the flux of said first path and the flux of said first and second flux paths in said first and second common portions, respectively.

10. A memory element comprising:
a nonmagnetizable base member having at least first and second apertures therethrough forming a web therebetween;
a memory element of magnetizable material affixed to the wall of said first aperture and said web and defined thereby;
a first flux path defined by the magnetizable material affixed to said web;
a second flux path defined by the magnetizable material affixed to the walls of said first aperture;
said first and second flux paths having a common portion;
a first conductor threading said first flux path;
a second conductor threading said second flux path;
interrogate means;
sense means;
information stored in said first flux path in a first or second and opposite circumferential remanent magnetic state;
information read out of said first flux path by said sense means by the coupling of said interrogate means to said second conductor causing a temporary flux to be induced in said second flux path effecting a temporary reduction of the flux in said first flux path due to the interaction of the flux of said first path and the flux of said second flux path in said common portions.

11. The method of fabricating a memory element on a member having formed therethrough at least a pair of apertures, the pair of apertures forming a web therebetween, which method comprises the steps of:

affixing a printed circuit conductor along the web;
affixing a magnetizable material to the walls of the apertures and to the web therebetween, the magnetizable material affixed to the web for forming a continuous strip about the web and the printed circuit conductor.

12. A method as in claim 11 and further including the step of disposing a layer of insulating material between the printed circuit conductor and the magnetizable material.

13. A method as in claim 11 and further including the step of threading the pair of apertures with an electrical conductor.

14. A method as in claim 11 wherein the magnetizable material is composed of approximately 83% nickel with the remaining portion being substantially iron.

15. The method of fabricating a memory element on an electrically insulating material having formed therethrough at least a pair of spaced-apart apertures forming a web therebetween, which method comprises the steps of:
affixing a first pair of substantially parallel electrical conductors to said web, the members of the conductor pair being disposed on opposite surfaces of said web;
affixing a magnetizable material to the walls of the apertures and to said web, the magnetizable material affixed to said web being arranged thereon such that it forms a continuous strip about the web.

16. A method as in claim 15 and further including the step of affixing a second pair of substantially parallel electrical conductors to said web, the members of the second conductor pair being disposed on opposite surfaces of the web in substantially parallel relationship to the first pair of electrical conductors.

17. A method as in claim 15 wherein the members of the first and second pairs of electrical conductors disposed on a common surface of said web are arranged thereon in a common plane.

18. The method of fabricating a memory element on a printed circuit member having at least one electrical conductor affixed thereto which method comprises the steps of:
forming at least a pair of spaced-apart apertures in the printed circuit member, the members of the pair being disposed on opposite sides of the conductor;
affixing a magnetizable material to the walls of the apertures and to a web formed therebetween, the magnetizable material affixed to said web being arranged thereon such that it forms a continuous strip about the web.

19. A method as in claim 18 wherein the apertures are formed with a substantially rectangular geometry.

20. The method of fabricating memory elements on an electrically insulating substrate member, which method comprises the steps of:
forming at least one electrical conductor on the substrate member;
affixing a layer of electrical insulation to the conductor-bearing surface of the substrate member such that the conductor is sandwiched between the substrate member and insulation layer;
forming at least a pair of apertures in the substrate member, the apertures being arranged on opposite sides of the electrical conductor for forming a web portion therebetween; and
affixing a magnetizable material to at least the aperture walls and the web portion therebetween.

21. The method of fabricating memory elements on an electrically insulating substrate member, which method comprises the steps of:
disposing at least one electrical conductor on the substrate member;
affixing a layer of electrical insulation to the conductor-bearing surface of the substrate member such that at least a predetermined portion of the conductor is sandwiched between the substrate member and the insulation layer;

forming at least a pair of apertures in the substrate member, the apertures being arranged on opposite sides of the electrical conductor for forming a web portion therebetween, which web portion includes the predetermined portion of the conductor sandwiched between the substrate member and the insulation layer;

affixing a layer of current conducting material to at least the walls of the apertures and the web portion between the apertures; and electrodepositing a layer of magnetizable material upon the current conducting layer.

22. The method of fabricating memory elements on an electrically insulating substrate member, which method comprises the steps of:

disposing at least one electrical conductor on the substrate member;

affixing a layer of electrical insulation to the conductor-bearing surface of the substrate member such that at least a predetermined portion of the conductor is disposed between the substrate member and the insulation layer;

forming at least a pair of apertures in the substrate member, the apertures being arranged on opposite sides of the electrical conductor for forming a web portion therebetween, which web portion includes the predetermined portion of the conductor disposed between the substrate member and the insulation layer;

forming a current conducting layer on the insulatively coated substrate member;

electrodepositing a magnetizable material upon the current conducting layer;

and thereafter removing selected portions of the current conducting layer and magnetizable material such that portions of these materials not removed appear only on the walls of the apertures and the web portion therebetween.

23. A method as in claim 22 wherein the portions of the current conducting layer and magnetizable material are removed by etching.

24. A method as in claim 22 wherein the magnetizable material is an alloy having a composition which includes nickel and iron.

References Cited by the Examiner

UNITED STATES PATENTS

| | | | |
|---|---|---|---|
| 2,878,463 | 3/1959 | Austen | 340—174 |
| 2,961,745 | 11/1960 | Smith | 29—155.5 |
| 2,981,932 | 4/1961 | Looney et al. | 340—174 |
| 2,985,948 | 5/1961 | Peters | 29—155.5 |
| 2,988,688 | 6/1961 | Lincoln et al. | 315—13 |

References Cited by the Applicant

UNITED STATES PATENTS

| | | |
|---|---|---|
| 2,882,519 | 4/1959 | Walentine et al. |
| 3,130,134 | 4/1964 | Jones. |
| 3,138,785 | 6/1964 | Chapman et al. |
| 3,154,840 | 11/1964 | Shahbender. |

BERNARD KONICK, *Primary Examiner.*

S. M. URYNOWICZ, *Assistant Examiner.*